United States Patent [19]
Deng

[11] Patent Number: 5,548,863
[45] Date of Patent: Aug. 27, 1996

[54] INTEGRATED DEPRESSED PARK AND SNOW PACK MECHANISM FOR WINDSHIELD WIPER SYSTEM

[75] Inventor: Xiaoming Deng, Ann Arbor, Mich.

[73] Assignee: Ford Motor Company, Dearborn, Mich.

[21] Appl. No.: 417,538

[22] Filed: Apr. 6, 1995

[51] Int. Cl.⁶ .................................................. A47L 1/00
[52] U.S. Cl. ................................ 15/250.16; 15/250.13; 15/250.3; 74/42; 74/470; 74/600
[58] Field of Search .................... 15/250.13, 250.16, 15/250.3, 250.31; 74/42, 470, 600

[56] References Cited

U.S. PATENT DOCUMENTS

| | | |
|---|---|---|
| 4,264,997 | 5/1981 | Kolb et al. . |
| 4,878,398 | 11/1989 | Heinrich . |
| 5,179,759 | 1/1993 | Epple et al. . |
| 5,179,760 | 1/1993 | Abe . |
| 5,226,200 | 7/1993 | Buchanan, Jr. et al. . |
| 5,388,482 | 2/1995 | Jones et al. . |

FOREIGN PATENT DOCUMENTS

| | | |
|---|---|---|
| 0553616 | 8/1993 | European Pat. Off. . |
| 1099876 | 2/1961 | Germany .................. 15/250.16 |
| 2943966 | 10/1979 | Germany . |
| 2029542 | 7/1979 | United Kingdom . |

Primary Examiner—David Scherbel
Assistant Examiner—Terrence R. Till
Attorney, Agent, or Firm—David B. Kelley

[57] ABSTRACT

A vehicle window wiping system has an integrated depressed park and snow pack mechanism providing a variable depressed park wiper position. The system has a dual direction motor which rotates a lost motion mechanism having a drivepin attached to a drive arm for converting rotary motion of the lost motion mechanism to oscillatory motion of the window wipers. The lost motion mechanism has a baseplate separably connected to a crank and linkedly connected to the drivepin for changing the radius of rotation thereof when the crank reaches a first predetermined position upon reversal of motor direction. The lost motion mechanism also has a snow pack plate separably connected to the crank and linkedly connected to the drivepin for permitting the crank to rotate to a second predetermined position upon reversal of shaft direction in the event that a snowpack condition on the vehicle window prevents the wipers from moving to a full depressed park position.

17 Claims, 4 Drawing Sheets

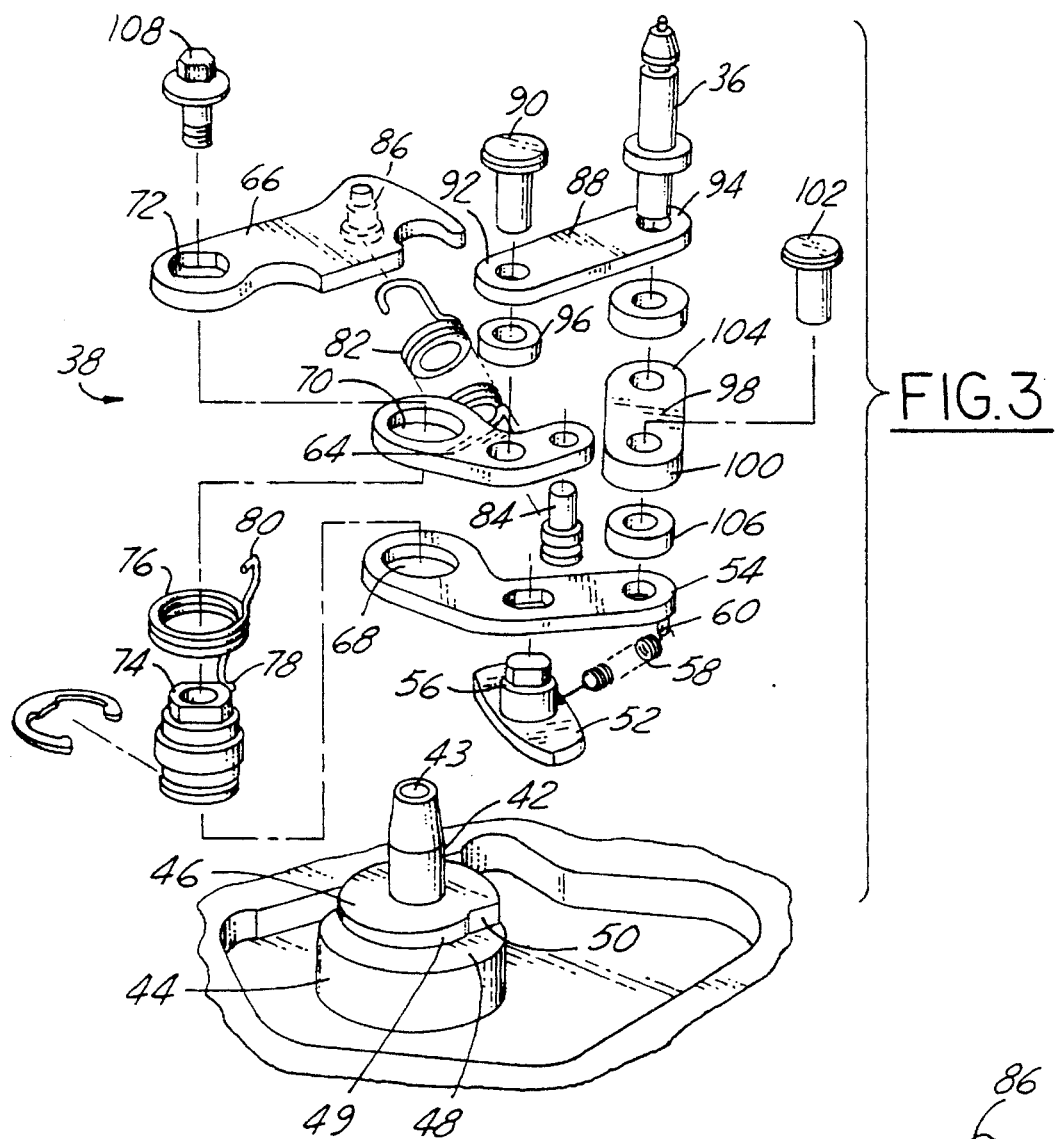
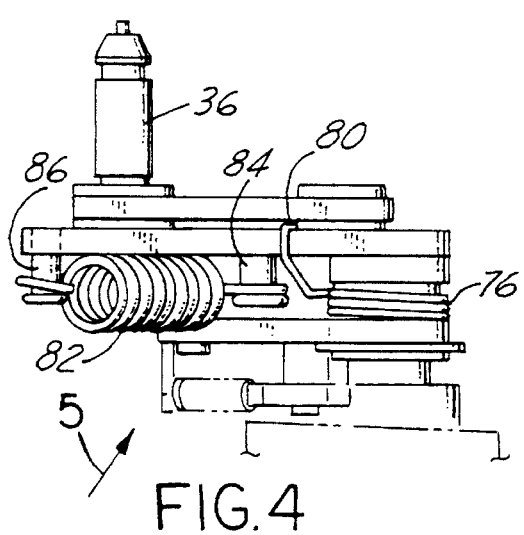
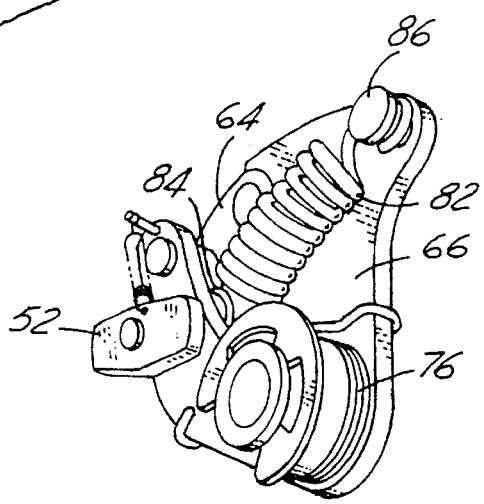

5,548,863

INTEGRATED DEPRESSED PARK AND SNOW PACK MECHANISM FOR WINDSHIELD WIPER SYSTEM

FIELD OF THE INVENTION

The present invention relates to windshield wiping mechanisms, and, more particularly, to a windshield wiping mechanism having a variable depressed park position.

BACKGROUND OF THE INVENTION

Automotive vehicle designers often desire a windshield wiping mechanism having a wiper which is positioned near or below the window cowl when not in operation, sometimes called a depressed park position. A wiper depressed park position is desirable for aesthetic purposes, as well as for preventing damage to the wipers when exposed to environmental conditions. Mechanisms for moving the wipers to the depressed park position typically do so by forcing a drive pin through which the motor drives the wipers to a radially altered position, as shown in U.S. Pat. No. 4,878,398 (Heinrich). Such mechanisms, however, do not allow for the possibility that snow, ice, slush, accumulated debris, or other obstructions may prevent the wipers from reaching the depressed park position when operation ceases. In such a circumstance, the motor may continue to drive the wipers to the depressed park position potentially resulting in damage to the motor and the wiper linkages.

Some windshield wiping mechanisms alter the wiping pattern, or range, in response to accumulated snow during windshield wiping operation, as shown in U.S. Pat. No. 5,179,760 (Abe). Such a mechanism does not provide variable depressed park capability but is merely directed to changing the wiper range during normal wiping operation.

SUMMARY OF THE INVENTION

The present invention overcomes the drawbacks of the related art by providing a vehicle window wiper system with an integrated depressed park and snow pack mechanism allowing a variable depressed park wiper position. The wiper system has a dual direction motor for rotating a shaft having a lost motion mechanism mounted thereto for rotatable movement therewith. The lost motion mechanism has a drivepin, means for changing the radius of rotation of the drivepin around the shaft when the shaft reaches a first predetermined position upon reversal of motor direction, and means for allowing the shaft to rotate to a second predetermined position upon reversal of motor direction when the drivepin is prevented from changing radius of rotation with the shaft in the first position. The wiper system also has at least one means for transforming the rotary motion of the drivepin to oscillatory motion of at least one window wiper.

In a preferred embodiment, the lost motion mechanism has a crank mounted on the shaft for rotation therewith and a drivepin linkedly connected thereto. A base plate is biasedly connected by a torsional spring to the crank, is mounted for rotation around the shaft on a first baseplate end between the stop base and the crank, and is pivotally linked to the drivepin on a second baseplate end. A snow pack plate is biasedly connected by a tension spring to the crank, is mounted for rotation around the shaft on a first packplate end between the crank and the base plate, and is pivotally linked to the drivepin on a second packplate end.

A first link is pivotally connected on one end to the second baseplate end and is pivotally connected on the other end to the drivepin. A second link is pivotally connected on one end to the second packplate end and is pivotally connected on the other end to the drivepin. When the shaft reaches a first predetermined position upon reversal of motor direction, a stop link carried on a stop base side of the base plate interacts with a catch on the stop for restraining the base plate from rotation. The crank thus separates from the baseplate by overcoming the bias force of the torsional spring so that the drivepin pivots to a new radius of rotation about the shaft. During this separation of crank and baseplate, the first link and the second link pivot about the first baseplate end and the first packplate end, respectively, through rotation of the snow pack plate with the crank to a second predetermined position. When the drivepin is prevented from changing radius of rotation upon reversal of motor directions, the snow pack plate separates from the crank by overcoming the bias force of the tension spring so that the shaft and the crank can rotate to the second predetermined position.

Thus, an advantage of the present invention is a windshield wiping system which provides a variable depressed park capability.

Another advantage is a wiping system which provides low or hidden wiper positioning for cowl styling flexibility.

Yet another advantage of the present invention is a wiper lost motion mechanism which protects the wiper system from damage in the event the wipers are obstructed during depressed park operation.

A feature of the present invention is a lost motion mechanism having a crank with a baseplate biasedly connected thereto for separation therewith upon reversal of the system motor for changing the radius of rotation of a drivepin linkedly connected to the crank so as to change the sweep radius of the wiper blades.

Another feature of the present invention is a lost motion mechanism having a snow pack plate biasedly connected with the crank and linkedly connected to the baseplate which separates from the crank upon reversal of the system motor when the drivepin is prevented from changing the radius of rotation so as to maintain the radius of rotation of the drivepin under a snow pack condition to allow the crank to move to a predetermined position.

Yet another feature is a latch carried under a lost motion mechanism base plate which interacts with a catch on a base surrounding the motor shaft to stop rotation of the base plate when in a predetermined position after the motor direction is reversed.

BRIEF DESCRIPTION OF THE DRAWINGS

These and other objects, advantages and features of the present invention will be apparent to those skilled in the windshield wiping arts upon reading the following description with reference to the accompanying drawings, in which:

FIG. 3 is an exploded view of the mechanism of FIG. 2;

FIG. 4 is a perspective view taken along line 4—4 of FIG. 2;

FIG. 5 is a perspective view in the direction of arrow 5 in FIG. 4;

DETAILED DESCRIPTION OF THE PREFERRED EMBODIMENTS

Figure 1:
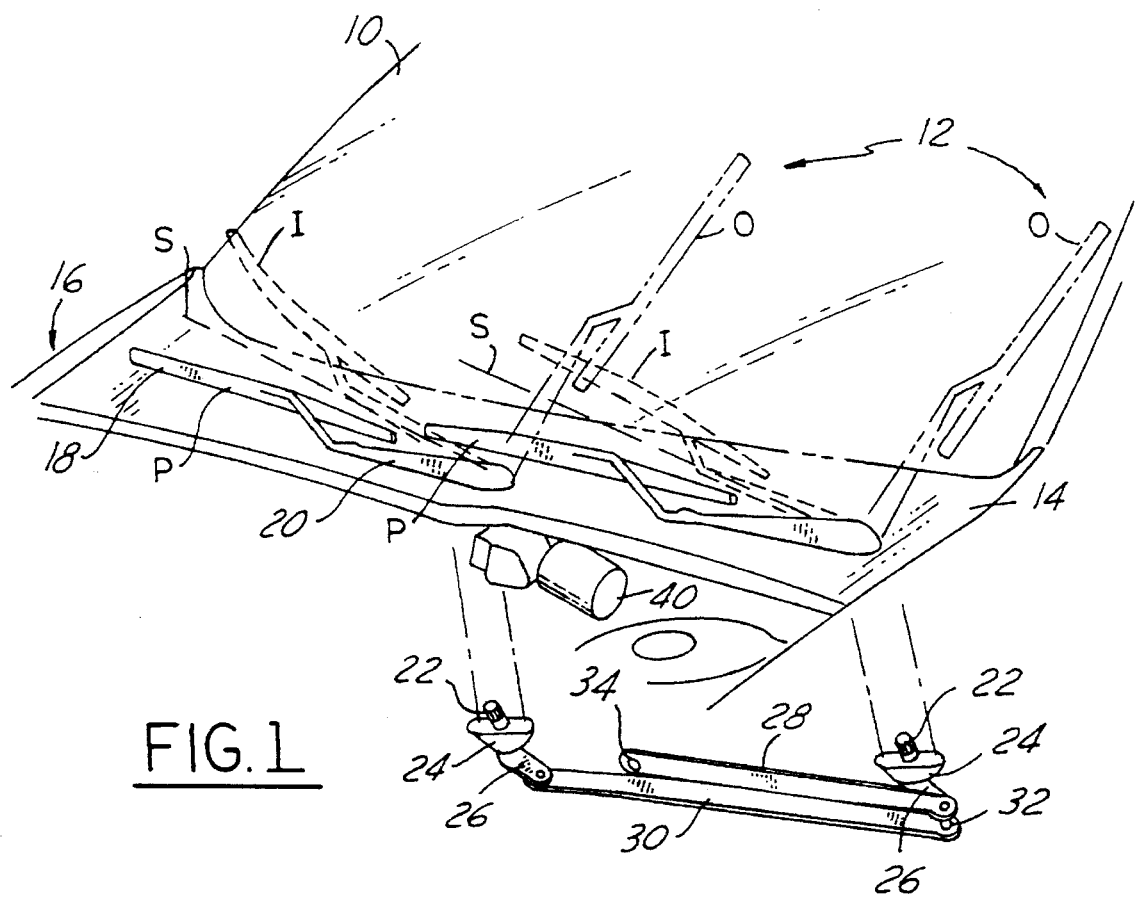
FIG. 1 is a perspective view of an automotive vehicle windshield showing the park, run, and snow pack positions of the wiper blades.

Referring now to the drawings, and in particular to FIG. 1 thereof, an automotive windshield 10 has a pair of wipers 12 attached below a cowl portion 14 of the vehicle front end 16. Wipers 12 are movable between an out-wipe position O and in-wipe position I during window 10 wiping operation. When not in operation, the wipers 12 are moved to a depressed park position P below the cowl 14. Such a wipers 12 are moved to a depressed park position P below the cowl 14. Such a position improves vehicle 16 appearance and styling while providing protection for the wipers 12 from excessive wear due to the elements, such as wind, rain, and ice.

Figure 2:
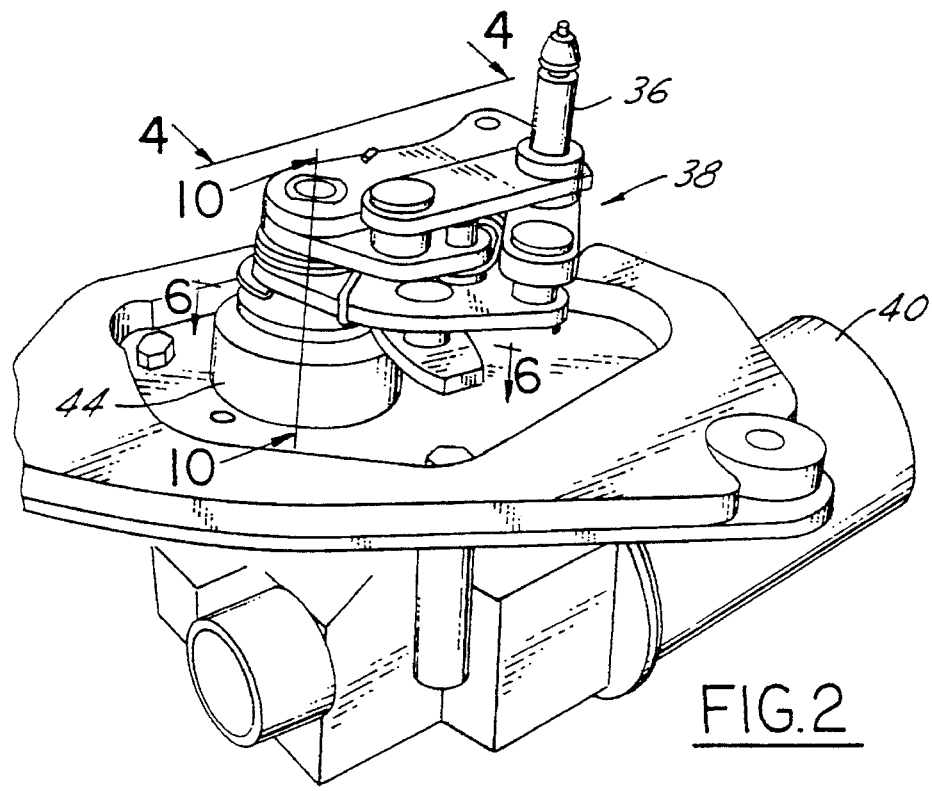
FIG. 2 is a perspective view of an integrated depressed park and snowpack mechanism according to a preferred embodiment of the present invention.

Each wiper 12 has a wiper blade 18 and a wiper arm 20. The wiper arm 20 is fitted to one end of a wiper shaft 22 in a shaft mount 24. The other end of the shaft 22 is pivotally fitted to a drive link 26, which is pivotally connected to either the drive arm 28 or the slave arm 30. The slave arm 30 transmits the oscillatory motion of the drive arm 28 through link 32 to that drive link 26 not connected to the drive arm 28. The drive arm 28 is pivotally connected on one end 34 to a drive pin 36 (FIG. 2) which is part of a lost motion mechanism 38 rotated by a motor 40 through a shaft 42 (FIG. 3).

When the motor 40 is shut off, the lost motion mechanism 38 positions the wipers 12 to the depressed park position P, or alternatively, to a snow pack position S when snow, ice, debris, or some other obstacle prevents them from moving to the park position P (FIG. 1). The snow pack position S ranges between the in-wipe position I and the park position P.

The motor 40 is a dual direction motor which can rotate the shaft 42 in either a clockwise or counterclockwise direction. Motor 40 typically rotates the shaft 42 in one direction during wiping operations so that the wipers 12 move between the out-wipe position O and the in-wipe position I. When the wiping mechanism is turned off by the vehicle operator, the construction of motor 40 is such that it automatically reverses direction and rotates the shaft 42 to a predetermined position. As further explained below, reverse rotation of the shaft 42 and the lost motion mechanism 38 attached thereto results in the wipers achieving the depressed park position P or, alternatively, the snow pack position S.

In FIG. 3, the construction of a preferred embodiment of a lost motion mechanism 38 according to the present invention is shown in exploded view. Beginning near the bottom of FIG. 3, a cylindrically shaped base 44, on the casing of motor 40, has the shaft 42 projecting therefrom. A cam 46 sits atop a surface 48 of the base 44 and has a radially contoured surface 49 with a land 50 which interacts with a stop latch 52 (FIG. 6) to halt rotation of portions of the lost motion mechanism 38 when the motor direction is reversed, as is further described below.

The stop latch 52 is fitted to the bottom of a base plate 54 via post 56, and a spring 58 attaches between the stop latch 52 and a downwardly projecting pin 60 to align the stop latch 52 so as to squarely interact with the land 50.

A hub 62 fitted to the shaft 42 receives the base plate 54, a snow pack plate 64, and a crank 66 through bores 68, 70, and 72, respectively. The bore 72 of the crank 66 is rectangularly shaped to receive a nut 74 which is integral with the hub 62 so that the shaft 42 directly rotates the crank 66.

A torsional coil spring 76 concentric with the rotational axis of the shaft 42 has one end 78 hooked to the base plate 54 and another end 80 hooked to the crank 66 (FIGS. 4 and 5). The base plate 54 thus rotates with the crank 66 around the shaft 42 until the force of the spring 76 is overcome, which is further explained below. The snow pack plate 64 is also biased to rotate with the crank 66 via a tension spring 82 which hooks to a pair of spring posts 84, 86 on the base plate 54 and the crank 66, respectively (FIGS. 4 and 5).

It is important that the tension force of the tension spring 82 biasing the snow pack plate 64 to the crank 66 is substantially larger than the torsional force of the torsional spring 76, which biases the base plate 54 to the crank 66 so that the crank 66 separates from the base plate 64 at a much lower force at which the crank 66 separates from the snow pack plate 64. For example, the tension force of the tension spring 82 may be on the order of 75–100 lbs., whereas the torsional force of the torsional coil spring 76 may be on the order of 8–10 in-lbs. Those skilled in the art will recognize that the present invention is not intended to be limited to those spring forces, but can be adjusted appropriately depending on the number of wipers, wiper size, motor size, and construction of the various linkages connecting the motor shaft and the wipers. The snow pack plate 64 rotates with the crank 66 around the shaft 42 until the force of the spring 82 is overcome, as described in more detail below.

Referring again to FIG. 3, a first link 88 is pivotally mounted by pivot pin 90 to the snow pack plate 64 on one end 92, and has the drive pin 36 mounted on a second end 94. A spacer 96 separates the first end 92 of link 88 from the snow pack plate 64. A second link 98 has an end 100 pivotally mounted with pivot pin 102 to the base plate 54 and has the other end 104 pivotally mounted to the drive pin 36 axially therebelow at the end 94 of the first link 88. A spacer 106 separates end 104 of the second link from end 94 of the first link 88. A spacer 106 separates second link 98 at end 100 from the base plate 54.

Operation of the lost motion mechanism 38 is best understood with reference to FIGS. 6–9 and 11. Beginning with FIG. 7, it is seen that the lost motion mechanism 38 is rotated in a clockwise fashion around shaft 42. The crank 66, along with the base plate 54 and the snow pack plate 64, which are biased thereto as described above, carry the drive pin 36 through a radius R around the shaft 42. This rotary motion is translated through the drive arm 28, the slave arm 30, and the drive links 26 to oscillatory motion of the wipers 12 between the in-wipe position I and the out-wipe position O (FIG. 1). This translation of rotary motion into oscillatory motion is shown schematically in FIG. 11.

Figure 6:
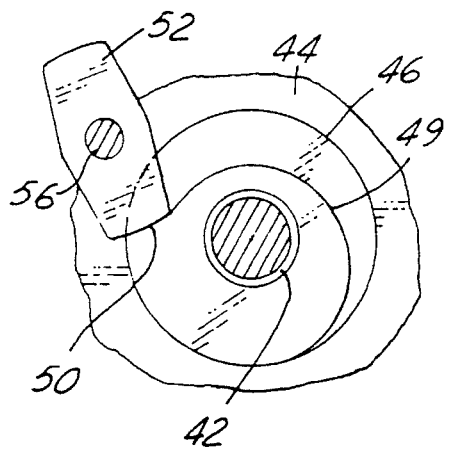
FIG. 6 is a view taken along lines 6—6 of FIG. 2.
Figure 7:
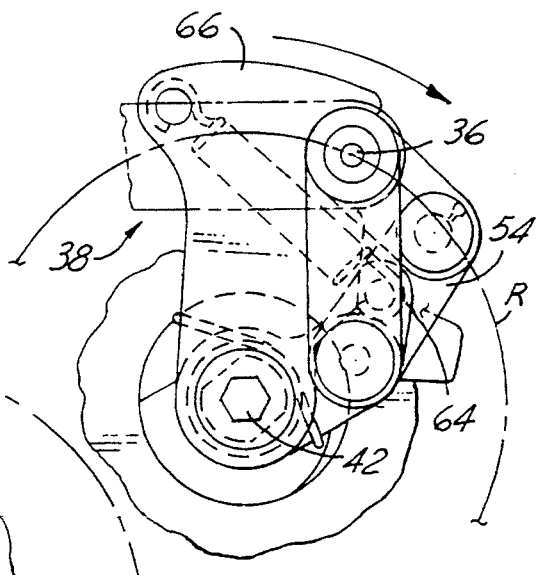
FIG. 7 is a view similar to FIG. 6 but also showing the integrated lost motion mechanism of the present invention in the run position.

During rotation of lost motion mechanism 38, as shown in FIG. 7, the latch 52 carried with base plate 54, rotates along cammed surface 49 in a clockwise direction. As latch 52 passes land 50, it moves to the contoured surface 49 and continues in a clockwise motion without inhibiting the movement of the lost motion mechanism 38. The latch spring 58 is supple enough to allow latch 52 to rotate around post 56 when passing the land 50 (FIGS. 1 and 6).

Figure 8:
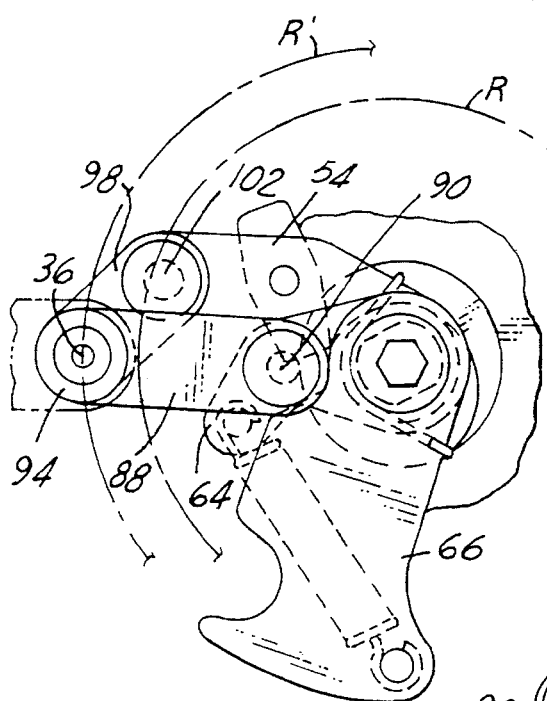
FIG. 8 is a view similar to FIG. 7 but showing the integrated lost motion mechanism in the depressed park position.
Figure 11:
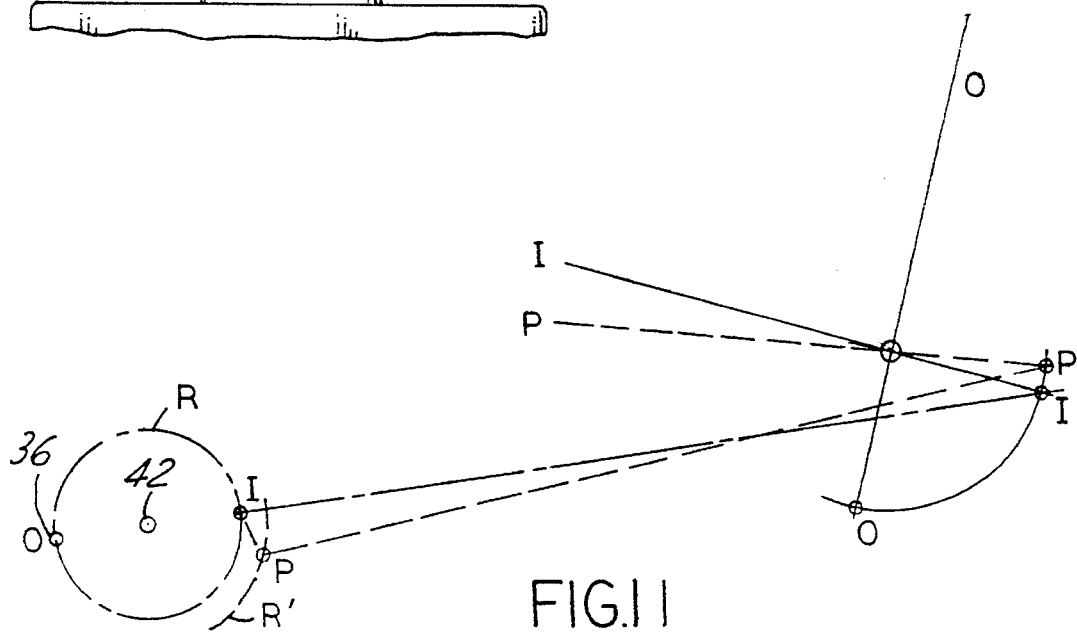
FIG. 11 is a simplified schematic representation of the operation of the integrated lost motion mechanism showing the run and depressed park mode.

When wiping operation ceases, as when a vehicle operator turns off the wiping mechanism, motor 40 reverses direction and rotates the shaft 42 and the crank 66 counterclockwise, as seen in FIGS. 6–9, to a predetermined position C. In doing so, the base plate 54 rotates with the lost motion mechanism 38, the latch 52 carried therewith squarely interacts with the land 50 on the contoured surface 49 such that the base plate 54 is restrained from further counterclockwise movement and stops at the position B. The shaft 42 and the crank 66 continue to turn counterclockwise before stopping at the predetermined position C, as shown in FIG. 8. In doing so, the crank 66 overcomes the biasing force of the torsional coil spring 78 connected to the base plate 54. The snow pack plate 84, however, remains biased to the crank 66 and turns therewith. Separation of the base plate 54 from the crank 66 and the snow pack plate 64 results in the link 88 pivoting radially outward about pivot pin 90 so that the drive pin 36 on end 94 thereof achieves a new radius of rotation R'. Simultaneously, the link 98 pivots about the pivot pin 102. This change of radius of rotation of drive pin 36 from radius R to radius R' results in the wipers 12 moving to the depressed park position as schematically shown in FIG. 11.

Figure 9:
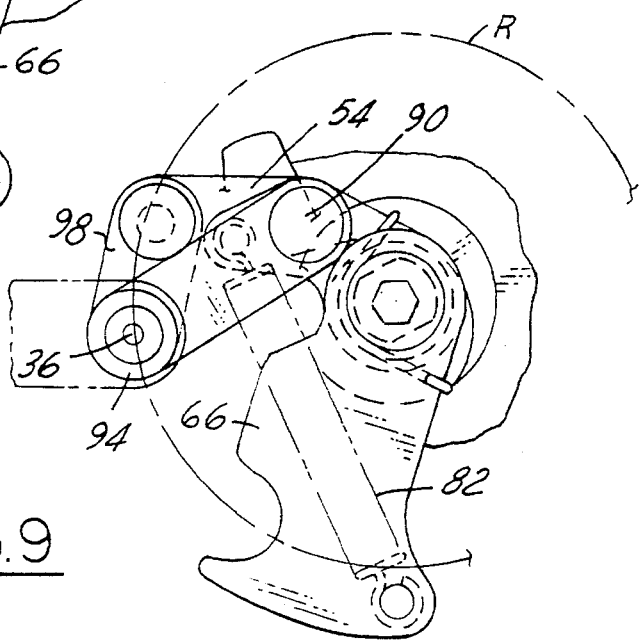
FIG. 9 is a view similar to FIG. 7 but showing the integrated lost motion mechanism in the snow pack position.

Under some conditions, the wipers 12 may be prevented from moving from the in-wipe position to the depressed park position when wiper operation ceases. However, motor 40 will continue to drive the shaft 42 and the crank 66 to the predetermined motor reversal position C. The snow pack plate 64 provides a means to allow the crank 66 to move to the motor reversal position C while permitting the drive pin 36 to remain at the radius R. Without the snow pack plate 64, the motor 40, the drive arm 28, the slave arm 30, and the links 26 may be damaged. To this end, when a snowpack condition prevents movement of wipers 12 to the depressed park position P, the drivepin 36 simultaneously prevents the snow pack plate 64 from moving with the crank 66 which elongates the tension spring 82 to overcome the bias force thereof in moving to the predetermined position C (FIG. 9). The drivepin 36 is thus remains at the radius R while the motor 40 completes its direction reversal by turning the shaft 42 and the crank 66 to the position C. The wipers 12 are then parked at the S position (FIG. 1).

Figure 10:
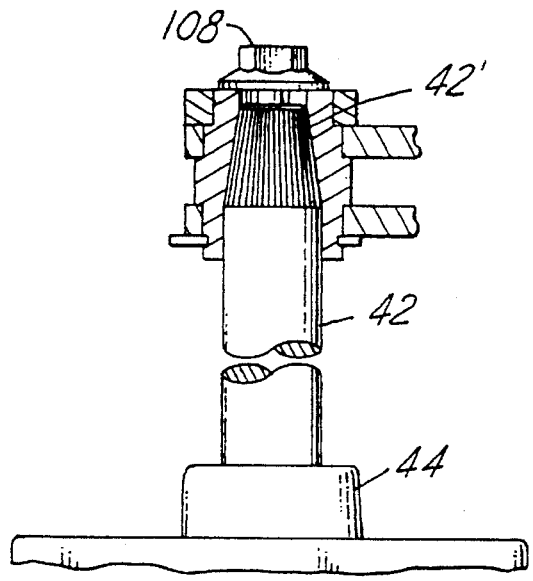
FIG. 10 is a view taken along lines 10—10 in FIG. 2.

Turning now to FIG. 10, attachment of the lost motion mechanism 38 to the shaft 42 is shown. The shaft 42 preferably has a knurled section 42' for better mating with the hub 62. A nut 108 attaches through bore 72 of crank 66 and into a threaded portion 43 of the shaft 42 (FIGS. 1 and 10).

Figure 12:
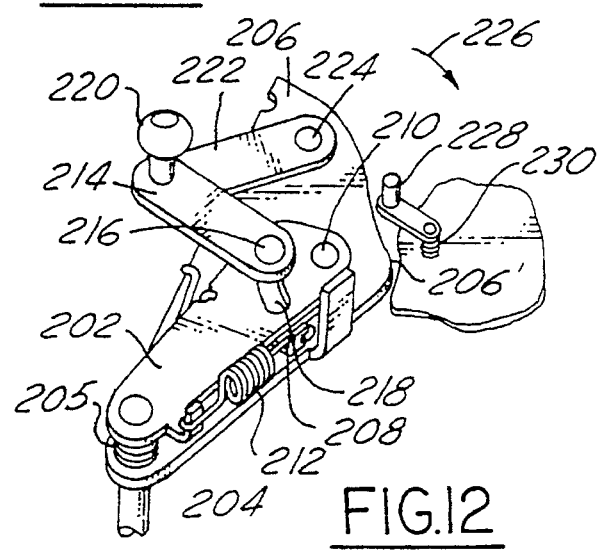
FIG. 12 is a perspective view of an alternative embodiment of an integrated lost motion mechanism of the present invention.

An alternative embodiment of the present invention is shown in FIG. 12. The crank arm 202 is directly mounted on the motor shaft 204. A base plate 206 is attached on the motor shaft and slides relative thereto in the depressed part cycle, as further described below. A snow pack plate 208 is pivotally connected at pivot 210 to the crank arm 202. The base plate 206 is biasedly connected to the crank arm 202 by spring 205. The snow pack plate is biasedly connected to the crank arm 202 with spring 212. A link 214 is connected to the snow pack plate 208 at pivot 216, which slidably engages slot 218. An output shaft 220 is mounted on the link 214 at an end opposite the pivot 216. A second link 222 is connected at pivot 224 with base plate 206 at one end thereof and at the other end is connected to the output shaft 220 axially below the link 214.

During wiping operation, which for purposes of FIG. 13 is in the counterclockwise direction shown by arrow 226, the motor shaft 204 drives the crank arm 202 and the contoured edge 206' of base plate 206 pushes the latch pin 228 outwardly against the force of latch spring 230. The motor shaft 204 reverses direction upon cessation of operation, the latch pin 228 catches the depression 232 in base plate 206 to stop its rotation while motor shaft 204 continuously drives the crank 202, thus transmitting the motion through the links 214 and 222. The motion of links 214 and 222 rotate against pivot 224, thus increasing the sweep radius of the output shaft 220, which moves the wipers to the depressed park position. The motor shaft 204 stops rotation when the crank arm 202 is aligned with the link 214.

When the output shaft 220 is prevented from increasing its sweep radius, for example when the wipers are obstructed from moving to the depressed park position, the snow pack feature of the present invention provides relief for the motor. Under those conditions, the output shaft 220 pushes the link 214 thereby resisting normal depressed park motion, which in turn drives the pivot 216 to slide in the groove 218 as the crank 202 continues to rotate and elongates the spring 212 as the crank 202 moves relative to the snow pack plate 208, thus providing snow park protection.

The lost motion mechanisms just described provide a wiper system to achieve a depressed park position which allows for low or hidden blades to increase cowl styling flexibility while also providing a snow pack device which protects the wiper motor and wiper system from damage due to snow pack conditions. Therefore, wiper system life is extended.

Although the preferred embodiments of the present invention have been disclosed, various changes and modifications may be made without departing from the scope of the invention as set forth in the appended claims.

I claim:

1. A windshield wiper system comprising:

an electric motor;

a shaft rotatable by said motor in a run direction and in a counter direction;

a drivepin connected with said shaft for rotation therearound;

at least one wiper;

means connecting said drivepin and said at least one wiper for transforming the rotary motion of said drivepin to oscillatory motion of said at least one wiper between an out-wipe position and an in-wipe position; and lost motion means connecting said shaft and said drivepin for moving said at least one wiper to a depressed park position when said motor rotates said shaft in said counter direction and for allowing said drivepin to remain in a position between said in-wipe position and said depressed park position when said at least one wiper is prevented from moving to said depressed park position.

2. A system according to claim 1 wherein said lost motion means comprises:

a crank mounted on said shaft for rotation therewith;

a snow pack plate connected with said crank;

a base plate connected with said crank;

stop means for stopping said base plate at a predetermined position when said motor rotates said shaft in said counter direction; and link means connecting said base plate, said snow pack plate, and said drivepin such that said drivepin changes radius of rotation when said stop means stops said base plate, said link means permitting said crank to separate from said snow pack plate when said drivepin is prevented from changing radius of rotation with said base plate in said predetermined position.

3. A system according to claim 2 wherein said snow pack plate is biasedly connected to said crank with a tension coil spring.

4. A system according to claim 3 wherein said base plate is biasedly connected to said crank with a torsional coil spring.

5. A system according to claim 4 wherein the tension force of the tension spring biasing the snow pack plate to the crank is substantially larger than the torsional force of the torsional spring biasing the base plate to the crank.

6. A system according to claim 2 wherein the link means comprises a first link pivotally mounted on a first end thereof to the snow pack plate and having the drivepin mounted on a second end, and a second link having one end pivotally mounted to the base plate and the other end pivotally mounted to the second end of the first link.

7. A system according to claim 2 wherein the stop means comprises a latch carried with the base plate for engaging a catch fixed relative thereto when the motor rotates said shaft in said counter direction.

8. A system according to claim 1 wherein said means connecting said drivepin and said at least one wiper comprises a drive arm attached to the drivepin on one end thereof and to a drive link on the other end thereof, said drive link attached to a wiper shaft for rotation therearound, said wiper shaft having said at least one wiper mounted thereto for oscillatory motion therearound.

9. A wiper system for a vehicle window, the system comprising:

(1) a dual direction motor having a shaft rotatable thereby in a predetermined direction;

(2) a lost motion mechanism mounted to the shaft for rotatable movement therewith, the lost motion mechanism having:

(a) a drivepin;

(b) means for changing the radius of rotation of the drivepin around the shaft when the shaft reaches a first predetermined position upon reversal of motor direction; and (c) means for allowing the shaft to rotate to a second predetermined position upon reversal of motor direction when the drivepin is prevented from changing radius of rotation with the shaft in the first position; and (3) at least one means for transforming the rotary motion of the drivepin to oscillatory motion of at least one window wiper.

10. A system according to claim 9 wherein the lost motion mechanism has a crank mounted on the shaft for rotation therewith, the crank connected to the drivepin for translation of rotary motion thereto.

11. A system according to claim 10 wherein the means for changing the radius of rotation of the drivepin comprises a base plate which is:

mounted for rotation around the shaft;

biasedly connected to the crank; and pivotally linked to the drivepin;

the base plate having stop means carried therewith for restraining the base plate from rotation when the shaft reaches the first predetermined position upon reversal of motor direction thereby separating the crank from the baseplate by overcoming the connecting bias force therebetween so that the drivepin pivots to a new radius of rotation about the shaft.

12. A system according to claim 11 wherein the stop means comprises:

a latch carried under the base plate; and a base surrounding the shaft having a catch thereon for interacting with the latch to stop rotation of the base plate when in the first predetermined position after the motor direction is reversed.

13. A system according to claim 12 wherein said base plate is biasedly connected to said crank with a torsional coil spring.

14. A system according to claim 10 wherein the means for allowing the shaft to rotate to the second predetermined position upon reversal of motor direction comprises a snow pack plate which is:

mounted for rotation around the shaft;

biasedly connected to the crank; and pivotally linked to the drivepin;

the snow pack plate separating from the crank from the baseplate by overcoming the connecting bias force therebetween when the drivepin is prevented from changing radius of rotation upon reversal of motor direction so that the shaft can rotate to the second position.

15. A system according to claim 14 wherein said snow pack plate is biasedly connected to said crank with a tension coil spring.

16. A system according to claim 15 wherein the tension force of the tension spring biasing the snow pack plate to the crank is substantially larger than the torsional force of the torsional spring biasing the base plate to the crank.

17. A wiper system for a vehicle window, the system comprising:

(1) a dual direction motor having a shaft rotatable thereby, in a predetermined direction, surrounded by a stop base;

(2) a crank mounted on the shaft for rotation therewith;

(3) a drivepin linkedly connected to the crank;

(4) a base plate biasedly connected by a torsional spring to the crank, mounted for rotation around the shaft on a first baseplate end between the stop base and the crank, and pivotally linked to the drivepin on a second baseplate end;

(5) a snow pack plate biasedly connected by a tension spring to the crank, mounted for rotation around the shaft on a first packplate end between the crank and the base plate, and pivotally linked to the drivepin on a second packplate end;

(6) a first link pivotally connected on one end to the second baseplate end and pivotally connected on the other end to the drivepin;

(7) a second link pivotally connected on one end to the second packplate end and pivotally connected on the other end to the drivepin;

(8) a stop link carried on a stop base side of the base plate which interacts with a catch on the stop for restraining the base plate from rotation when the shaft reaches a first predetermined position upon reversal of motor direction to thereby separate the crank from the baseplate by overcoming the bias force of the torsional spring so that the drivepin pivots to a new radius of rotation about the shaft as the first link and the second link pivot about the first baseplate end and the first packplate end, respectively, through rotation of the snow pack plate with the crank to a second predetermined position;

(9) the snow pack plate separating from the crank by overcoming the bias force of the tension spring when the drivepin is prevented from changing radius of rotation upon reversal of motor direction so that the shaft and the crank can rotate to the second predetermined position; and

(10) at least one means for transforming the rotary motion of the drivepin to oscillatory motion of at least one window wiper.

* * * * *